W. G. GATES.
ANIMAL TRAP.
APPLICATION FILED AUG. 13, 1910.
993,238.
Patented May 23, 1911.
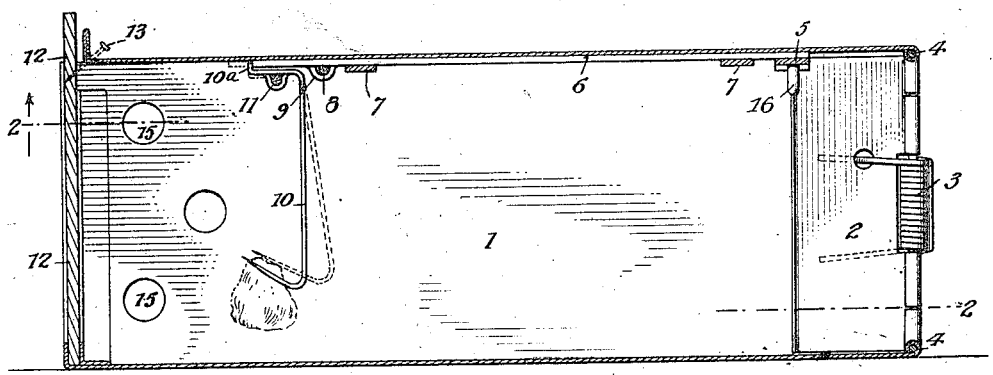
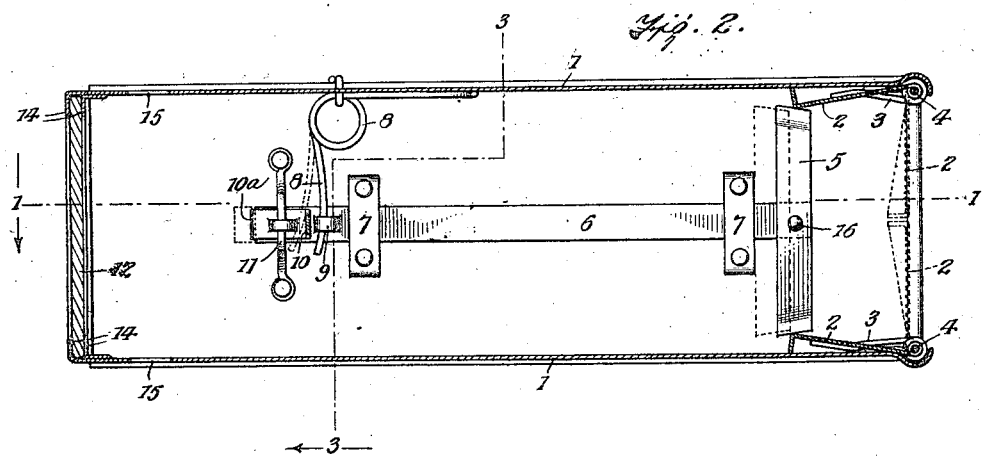
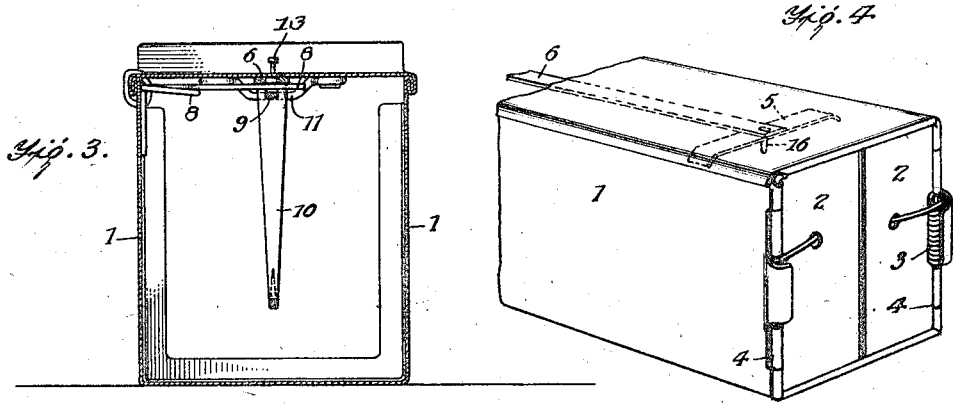
WITNESSES:
INVENTOR
WILLIAM G. GATES,
BY
ATTORNEYS

UNITED STATES PATENT OFFICE.

WILLIAM G. GATES, OF WALLACE, IDAHO, ASSIGNOR OF ONE-HALF TO ALTA L. HONEKER, OF WALLACE, IDAHO.

ANIMAL-TRAP.

993,238.

Specification of Letters Patent.  Patented May 23, 1911.

Application filed August 13, 1910.  Serial No. 576,991.

*To all whom it may concern:*

Be it known that I, WILLIAM G. GATES, a citizen of the United States, and a resident of Wallace, in the county of Shoshone, in the State of Idaho, have invented certain Improvements in Animal-Traps, of which the following is a specification.

My trap is adapted for use in capturing rodents such as mice, rats, mink, and muskrats, but is also available for capturing larger animals, when made of sufficient size.

The invention relates particularly to an improvement in box or cage traps and to improved means for tripping and releasing spring-actuated doors, so that they close automatically and thus confine the animal.

The details of construction and operation of parts are as hereinafter described, and illustrated in the accompanying drawing, in which—

Figure 1 is a longitudinal section on the line 1—1 of Fig. 2. Fig. 2 is a hoizontal section on the line 2—2 of Fig. 1. Fig. 3 is a transverse section on the line 3—3 of Fig. 2. Fig. 4 is a perspective view of the front or entrance end of the trap.

The body of the trap is in the form of an oblong, rectangular box 1, which may be constructed of various materials, preferably of galvanized sheet-iron. The normally open front end of the box is provided with hinged doors 2 which are held normally closed by means of wire springs 3 that are coiled about the pintles 4. The pintles are part of a wire frame which is inserted in the end of the box 1 and held in place by the sheet metal, which is bent around it. Thus, the frame with the sheet metal applied projects inward from the planes of the sides of the box sufficiently to form stops for the doors when closed, so that they may be held in the same plane, as indicated by dotted lines in Fig. 2 and full lines in Fig. 4.

When the trap is set, the doors 2 are pressed inward and backward into the positions shown by full lines in Fig. 2, and are set or locked in such position by means of a transverse trip-bar 5 which is attached to a bar 6 that is supported in keepers 7 fastened to the top of the trap and adapted to slide therein. Thus, the whole trip device 5, 6, is held flat against the upper side of the trap as shown in Fig. 1. The ends of the transverse trip-bar 5 are preferably bent downward a little in order to better adapt them for engagement with the doors 2.

It is apparent that, if the trip 5, 6, be moved into the position indicated by dotted lines in Fig. 2, the doors 2 will be released and thus closed automatically by means of the springs 3. The trip 5, 6, is normally retracted by means of a coiled wire spring 8 whose attachment and arrangement in connection with the side of the box is sufficiently illustrated in Fig. 2, one free end of the spring engaging a loop 9 pressed out from the longitudinal bar 6.

The trigger 10—see Figs. 1 and 3—is formed of a wire or rod hung loosely on a pivot 11 and having its lower end bent upward and sharpened to facilitate the attachment and suspension of bait. The said pivot is formed by means of a stout wire whose ends are riveted or otherwise secured to the under side of the top 6 of the trap and whose middle portion is depressed and passes through a loop formed on the trigger 10. The upper end of the trigger 10 is bent twice at a right angle, and thus a shoulder 10ª is formed which serves as a catch, it being adapted to lock with or engage the adjacent end of the trip bar 6.

The doors 2 are shown in Figs. 1 and 2, as open, the transverse trip bar 5 being arranged between and engaging their free ends; and in such position the longitudinal trip bar 6 is, of course, engaged with the catch 10ª of the trigger 10. Thus, an animal entering the open end of the box and nibbling the bait suspended from the trigger 10, will sooner or later release the latter from engagement with the trip-bar 6, whereupon the spring 8 instantly retracts the trip and releases the doors 2, which are closed instantaneously by the action of the springs 3, thus imprisoning the animal.

The rear end of the box or cage may be closed by a metal plate, or a glass plate, or mirror 12, and the latter may be held securely in place by means of a pin 13 inserted through it and the vertical lip or flange formed on the top of the box. The plate 12 is held slidably between parallel flanges 14 arranged as shown in Fig. 2. After the animal has been caught or imprisoned, the plate 12 may be conveniently raised or withdrawn, to discharge him from the trap. The sides of the latter are provided with holes 15 for admission of light at a point adjacent to the bait.

The trip device is provided at the junction of the bars 5, 6, with a pendent pin 16—see Figs. 1 and 2—which serves as a finger or thumb-piece in setting the trap, or, in other words, as a pull, whereby the trigger may be retracted against the tension of the spring 8 in order to set it in contact with the doors.

What I claim is:—

1. The improved animal trap, comprising a box-like structure, one end being provided with hinged spring-closed doors, a set and trip device comprising a transverse bar and a longitudinal bar suspended slidably from the top of the box and the transverse bar arranged and adapted for engagement with the doors when open, a spring coacting with the trip for retracting it, and a bait-suspending trigger pendent from the top of the box and adapted to engage the adjacent end of the trip, for holding it in operative position when the trap is set, substantially as described.

2. In a trap of the type indicated, a box-like inclosure whose body is formed of sheet-metal, a rectangular frame arranged in the open end of the same and the metal closed around it, thus forming a shoulder on the inner side of the inclosure, doors hinged on such frame, and wire springs coiled about the frame and their free ends engaging the doors, as shown and described.

3. In a trap of the type indicated, the combination with the body of the trap and hinged spring-closed doors arranged at one end, of a trip device comprising a transverse bar adapted to engage the doors when open, a longitudinal bar slidable in keepers and supported upon the top of the box, a spring for retracting the trip, and a bait-carrying trigger hinged at the top of the box and having a shoulder adapted to engage the adjacent end of the trip for holding it in the position required to set the trap, substantially as described.

WILLIAM G. GATES.

Witnesses:
MERRILL HIBLETHWAITE,
J. T. ELLARSON.